United States Patent Office 3,846,115
Patented Nov. 5, 1974

---

3,846,115
HERBICIDAL COMPOSITION
Makoto Konnai, Hiroshi Kamata, and Masaru Kado, Shizuoka Prefecture, Japan, assignors to Kumiai Chemical Industry Co., Ltd., Tokyo, Japan
No Drawing. Original application Mar. 19, 1970, Ser. No. 19,546, now Patent No. 3,582,314. Divided and this application Mar. 12, 1971, Ser. No. 123,881
The term of this patent subsequent to June 1, 1988, has been disclaimed
Int. Cl. A01n 9/12
U.S. Cl. 71—100    1 Claim

ABSTRACT OF THE DISCLOSURE

A herbicidal composition comprising as an active ingredient a thiocarbamate compound of the formula $$R-\overset{O}{\underset{\|}{C}}-S-CH_2-R'$$

in which R is selected from the group consisting of mono-alkylaminodialkylamino-, piperidino- and morpholino-radical and R' is a halogenated phenyl.

---

This application is a division of copending application Ser. No. 19,546 filed Mar. 19, 1970 and now U.S. Pat. No. 3,582,314.

The present invention relates to herbicidal compositions containing S-halobenzyl-thiocarbamates having the following general formula as an active ingredient and a method for combatting weeds by using the above described S-halobenzyl-thiocarbamates as the active ingredient.

The S-halobenzyl-thiocarbamates used herein have the general formula $$R-\overset{O}{\underset{\|}{C}}-S-CH_2-R'$$

wherein R' is halophenyl group and R is monoalkylamino, dialkylamino, piperidino or morpholino group.

S-halobenzyl-thiocarbamates according to the present invention are active as herbicidal composition and have a high activity for controlling germination of various weeds in agricultural field and particularly, said compounds can prevent Wiregrass (*Eleocharis acicularis* ROEM. et SCHULT), Barnyard grass (*Echinochloa crus-galli* P. BEAUV) and Crabgrass (*Rigitaria adscendens* HENR.), which are main noxious weeds in paddy.

Herbicidal composition applied previously to paddy have involved PCP, NIP (active ingredient: 4-nitro-2',4'-dichlorodiphenyl ether), Prometryne (active ingredient: 2-methylthio-4,6-bis(isopropylamino)-S-triazine) and other numerous compositions, but almost all of them have been used for controlling germination of weeds after paddy rice plant is planted. These previous herbicidal compositions are effective for therophyte weeds generated at a relatively early stage after planting the rice plant, but have extremely poor activity or substantially no activity for Wiregrass of perennial weed. Recently, this Wiregrass has become a problem as preferential weed in paddy, because any herbicidal composition, which has no phytotoxicity to paddy rice plant and can prevent exactly Wiregrass, has never been discovered.

The reason why, Wiregrass has been unusually grown in paddy, is based on the fact that in general, the previous herbicidal compositions are spread 3 to 7 days after the rice plant is planted, while generation of Wiregrass is about 2 weeks after planted, that is, Wiregrass is generated when the activity of the herbicidal compositions are decreased and further Wiregrass is perennial, so that it has high resistance against the herbicidal composition.

The most active composition for preventing Wiregrass has been DBN (active ingredient: 2,6-dichlorobenzonitrile), but this composition is highly phytotoxic against paddy rice plant, so that it has problem in practice.

However, the S-halobenzyl-thiocarbamates according to the present invention are excellent in the activity for preventing Wiregrass and particularly, when they are used in an original stage of growth of Wiregrass, Wiregrass is completely prevented in an amount of less than 500 g./10 ares. Particularly, when surface layer of soil or water field paddy is applied with 250 g./10 ares before germination of the weed, the growth of the weeds, such as, Wiregrass, Barnyard grass and Crabgrass, etc., can be prevented and paddy rice plant planted in a depth of more than 2 cm. is not damaged. When 800 to 1,000 g./10 ares are used, the growth is slightly suppressed temporarily but hereafter is not affected and these compounds have substantially no damage.

Furthermore, when S-halobenzyl-thiocarbamates according to the present invention are used with PCP (pentachlorophenol) or its salts in combination, various therophytic weeds including perennial weed of Wiregrass can be completely prevented. Furthermore, a high herbicidal activity can be obtained in an amount of $\frac{1}{10}$ to $\frac{1}{5}$ the amount when both the compounds are used solely and an apparent synergistic effect can be recognized. The most effective range of the mixture ratio of S-halobenzyl-thiocarbamates to PCP is 1:0.5 to 10 by weight, when S-halobenzyl-thiocarbamates are combined with PCP.

Then, a method for producing S-halobenzylthiocarbamates according to the present invention will be explained in the following.

Halobenzyl mercaptan is dissolved in an inert solvent such as toluene or benzene and to the resulting solution is added dropwise a solution of phosgene in an inert solvent and the resulting mixture is stirred while cooling and added with a hydrochloride acceptor dropwise. Then, the resulting mixture is added dropwise with monoalkylamine or dialkylamine and the mixture is reacted. In order to remove hydrochloride of the hydrochloride acceptor (amines) after completion of the reaction, the reaction product is washed with water, dried and concentrated. Furthermore, the resulting liquid is purified by vacuum distillation.

This process is shown by the following reaction formulae.

$$R'CH_2SH + COCl_2 \xrightarrow{Base} R'CH_2S\overset{O}{\underset{\|}{C}}Cl + Base\ HCl$$

$$R'CH_2S\overset{O}{\underset{\|}{C}}Cl + RH \xrightarrow{Base} R'CH_2S\overset{O}{\underset{\|}{C}}R + Base\ HCl$$

The "base" means a hydrochloride acceptor, for example, triethylamine, dimethylaniline, diethylaniline, piridine, etc.

The typical S-halobenzyl-thiocarbamates of the present invention prepared by the above described reaction formulae are as follows:

(1) S-(2-chlorobenzyl)-N-methylthiocarbamate
(2) S-(4-chlorobenzyl)-N,N-diethylthiocarbamate
(3) S-(2-bromobenzyl)-N,N-diisopropylthiocarbamate
(4) S-(2,4-dichlorobenzyl)-N,N-diisopropylthiocarbamate
(5) S-(4-chlorobenzyl)-piperidino-1-carbothioate
(6) S-(3,4-dichlorobenzyl)-morpholino-4-carbothioate An example of the production will be mentioned as follows:

A solution of 31 g. (0.2 mol) of 4-chlorobenzylmercaptan in 100 ml. of toluene was mixed with 70 g. (about 0.2 mol) of 30% solution of phosgene in toluene. To the resulting mixture were added dropwise 24.2 g. (0.2 mol) of dimethylaniline, while stirring by cooling with ice at a temperature of lower than 5° C. After addition of said dimethylaniline, the mixture was stirred for one hour while maintaining such a condition and was added dropwise with 29.2 g. (0.4 mol) of diethylamine at a temperature of lower than 15° C. Furthermore, the resulting mixture was stirred at room temperature for one hour and then at about 60° C. for 3 hours and the reaction was completed and then the temperature was returned to room temperature.

After the reaction, the amine chloride was removed by washing with water and organic layer was dried with anhydrous Glauber's salt and then concentrated. The resulting liquid was purified by vacuum distillation to obtain 41 g. (yield: 79.5%) of a transparent liquid having a boiling point of 128 to 135° C./0.2 mm. Hg and a refractive index of $n_D^{19} = 1.5632$.

Elemental analysist.—Calculated value: N, 5.43. Found value: 5.28.

In addition, the other compound can be produced in the same manner as described above.

S-halobenzyl-thiocarbamates according to the present invention are mixed with diluents involving carriers and surfactants to prepare dust, emulsifiable concentrate and wettable powder, which are used directly or after diluted with water as herbicidal compositions.

Furthermore, said carbamates can be prepared into granular composition. Namely, said thiocarbamates are increased in an amount with bentonite, clay, talc, lime stone, etc. and added with a binder, such as, PVA (polyvinyl alcohol) and the resulting mixture is kneaded with water and subjected to an extrusion type of granule forming machine and the formed granules are dried. Alternatively, said thiocarbamates are dissolved in a proper solvent and the solution is homogeneously adsorbed into granular diatomaceous earth, vermiculite, etc. As the other means, by said thiocarbamates is coated surface of granular lime stone uniformly. The granules thus obtained are dispersed uniformly by hand, granule spreader, helicopter, etc.

The term "carrier" used herein means carrying agents used for transferring said thiocarbamates to desired areas, which may be solid or liquid. For example, as the solid carrier, mention may be made of various clays, talc, kaoline, diatomaceous earth, calcium carbonate, white carbon, saw dust, etc. As the liquid carrier, use may be made of a solvent for the active ingredient or a liquid which is non-solvent, but can disperse or dissolve the active ingredient through an adjuvant, for example, water, benzene, kerosene, alcohol, acetone, methylnaphthalene, xylene, etc.

The term "surfactants" used herein means unionic surfactants, such as, polyoxyethylenealkylaryl ether, polyoxyethylenesorbitane monolaurate, etc.; cationic surfactants, such as, alkyldimethylbenzyl ammonium chloride, alkyl-pyridinium halide, etc.; anionic surfactants, such as, alkylbenzene sulfonates, fatty alcohol sulfates, etc.; amphoteric surfactants, such as, lauryl amine derivatives, betaine derivatives, dodecyl diaminoethyl glycine, etc.

The invention will be further explained in detail with reference to the following preparation examples:

EXAMPLE 1

(Wettable powder)

Twenty five parts by weight of S-(2-chlorobenzyl)-N-methylthiocarbamate, 10 parts by weight of white carbon, 60 parts by weight of diatomaceous earth and 5 parts by weight of wetting agent of a mixture of polyoxyethylenealkyl phenol ether, polyoxyethylenephenylphenol ether and polyoxyethylene carbonate were mixed and milled and the resulting powder was suspended in water, which was sprayed.

EXAMPLE 2

(Granule)

Five parts by weight of S-(4-chlorobenzyl)-N,N-diethylthiocarbamate were sprayed on and adsorbed in 95 parts by weight of granular diatomaceous earth, which was being stirred and had 10 to 100 meshes.

EXAMPLE 3

(Emulsifiable concentrate)

Fifty parts by weight of S-(4-chlorobenzyl)-N,N-diethylthiocarbamate, 30 parts by weight of xylene and 20 parts by weight of an emulsifier of a mixture of polyoxyethylenealkylphenol ether, polyoxyethylenephenylphenol ether and polyoxyethylene carbonate were mixed and dissolved. The resulting solution was diluted with water and then sprayed.

EXAMPLE 4

(Granule)

Five parts by weight of S-(4-chlorobenzyl)-N,N-diethylthiocarbamate, 15 parts by weight of PCP sodium salt, 50 parts by weight of bentonite, 27 parts by weight of clay, 1 part by weight of sodium alkylarylsulfonate and 2 parts by weight of sodium ligninsulfonate were mixed and milled and then added with a suitable amount of water and kneaded and the kneaded mixture was subjected to an extrusion type of granule forming machine (open having 1 mm. diameter) to obtain granules, which were dried.

EXAMPLE 5

(Granule)

Seven parts by weight of S-(4-chlorobenzyl)-N,N-diethylthiocarbamate, 10 parts by weight of PCP sodium salt, 10 parts by weight of diatomaceous earth, 40 parts by weight of bentonite, 30 parts by weight of clay, 2 parts by weight of sodium alkylsulfonate and 10 parts by weight of PVA were mixed and milled and added with a suitable amount of water and the resulting mixture was kneaded and then subjected to an extrusion type of granule forming machine (open having 1 mm. diameter) to form granules which were dried.

EXAMPLE 6

(Wettable powder)

Twelve point five parts by weight of S-(4-chlorobenzyl)-N,N-diethylthiocarbamate, 25 parts by weight of PCP, 30 parts by weight of clay, 29.5 parts by weight of diatomaceous earth, 1 part by weight of polyoxyethylene-alkylaryl ester and 2 parts by weight of sodium ligninsulfonate were mixed and milled to obtain a wettable powder.

In order to show the activity of the herbicidal compositions of the present invention, Experimental examples are described as follows:

*Experimental example 1*

Three groups of 3-leaf stage young paddy rice plant (species: KINMAZE), one group of which has two rice plants, were planted in a pot of 15 cm. diameter. After the rice plant took, 30 Barnyard grass seeds per pot were sowed on the surface layer of the soil and the pot was filled with water to a depth of 1 cm. and one day later granular compositions containing 5% active ingredients of the present invention (Example 2) were spread in such amounts that the amounts of active ingredients were 100 g., 250 g. and 500 g. per 10 acres. Two weeks after the treatment, the growth degree of the weed and the phytotoxicity on the paddy rice plants were estimated.

| Active ingredient | Dose, g./10 a. | Number of Barnyard grass plants | Number of Broad-leaf weeds | Phytotoxicity on paddy rice plant |
|---|---|---|---|---|
| Compound 1 | 500 | 0 | 0 | No damage. |
|  | 250 | 1 | 2 | Do. |
|  | 100 | 5 | 11 | Do. |
| Compound 2 | 500 | 0 | 0 | Do. |
|  | 250 | 0 | 1 | Do. |
|  | 100 | 0 | 2 | Do. |
| Compound 3 | 500 | 0 | 0 | Do. |
|  | 250 | 0 | 3 | Do. |
|  | 100 | 0 | 1 | Do. |
| Compound 4 | 500 | 0 | 0 | Do. |
|  | 250 | 0 | 2 | Do. |
|  | 100 | 0 | 9 | Do. |
| Compound 5 | 500 | 0 | 0 | Do. |
|  | 250 | 0 | 1 | Do. |
|  | 100 | 0 | 7 | Do. |
| Compound 6 | 500 | 0 | 0 | Do. |
|  | 250 | 0 | 3 | Do. |
|  | 100 | 1 | 6 | Do. |
| S-benzyl-N,N-diethyl thiocarbamate (comparative compound). | 500 | 1 | 4 | Heavy damage. |
| Do | 250 | 4 | 8 | Slight damage. |
| Do | 100 | 7 | 13 | No damage. |
| Non-treated | 0 | 28 | 33 | Do. |

*Experimental example 2*

A pot of 12 cm. diameter was filled with upland soil and wheat and radish seeds were sowed in the pot and then the pot was covered with soil in a depth of 2 cm. In this case, the covering soil had been previously mixed with Crabgrass seeds. One day after covering the pot with soil, the suspensions obtained by diluting the wettable powders having 50% of the active ingredients with 10 ml. of water in such a manner that the given amounts as shown in the following table were applied, were sprayed uniformly on the soil surface. The determination was made three weeks after the spraying.

| Active ingredient | Dose, g./10 a. | Crabgrass (g.) | Wheat | Radish |
|---|---|---|---|---|
| Compound 1 | 500 | 0.2 | ± | ± |
|  | 250 | 3.2 | − | − |
|  | 100 | 6.7 | − | − |
| Compound 2 | 500 | 0 | ± | ± |
|  | 250 | 1.3 | − | − |
|  | 100 | 7.3 | − | − |
| Compound 3 | 500 | 0.1 | + | ± |
|  | 250 | 4.2 | − | − |
|  | 100 | 9.0 | − | − |
| Compound 4 | 500 | 0 | + | ± |
|  | 250 | 2.8 | − | − |
|  | 100 | 8.3 | − | − |

See footnotes at end of table.

| Active ingredient | Dose g./10 a. | Crabgrass (g.) | Wheat | Radish |
|---|---|---|---|---|
| Compound 5 | 500 | 1.3 | ± | + |
|  | 250 | 2.8 | − | − |
|  | 100 | 6.0 | − | − |
| Compound 6 | 500 | 0.8 | + | ± |
|  | 250 | 1.6 | − | − |
|  | 100 | 5.8 | − | − |
| Non-treated | 0 | 10.8 | − | − |

NOTE.— −=no damage, ±= very slight damage, += slight damage.

*Experimental example 3*

A pot of 15 cm. diameter was fed with paddy soil containing Wiregrass root and then filled with water. Two days after the filling, the suspensions obtained by diluting the wettable powders having 25% of the active ingredients with 5 ml. of water in such a manner that the given amounts as shown in the following Table were applied, were dropped on the pot and the thus treated pots were left to stand in a green-house. Two weeks after the treatment, the growth state of Wiregrass was estimated and further one month later the weight of the living plants of Wiregrass were determined. The obtained results are as follows:

| Active ingredient | Dose, g./10 a. | State two weeks after treated | Weight of living plant one month after treated (g.) |
|---|---|---|---|
| Compound 1 | 100 | ++ | 0.8 |
|  | 250 | + | 0.01 |
|  | 500 | − | 0 |
| Compound 2 | 100 | − | 0.01 |
|  | 250 | − | 0 |
|  | 500 | − | 0 |
| Compound 3 | 100 | + | 1.0 |
|  | 250 | − | 0.1 |
|  | 500 | − | 0 |
| Compound 4 | 100 | + | 1.3 |
|  | 250 | ± | 0.3 |
|  | 500 | − | 0 |
| Compound 5 | 500 | + | 0.7 |
|  | 250 | ± | 0.2 |
|  | 100 | − | 0 |
| Compound 6 | 500 | ++ | 1.2 |
|  | 250 | ± | 0.3 |
|  | 100 | − | 0 |
| Non-treated | 0 | +++ | 4.2 |

NOTE.— −=no growth; ±=slight growth; +=moderate growth; ++=heavy growth; +++=very heavy growth.

*Experimental example 4*

A pot of 15 cm. diameter was fed with paddy soil and planted with three groups of young paddy rice plants (species: KINMAZE), one group of which has two rice plants. After the rice plants took, 30 Barnyard grass seeds were sowed in the pot and then herbicidal compositions of the invention (wettable powder) and comparative compositions diluted with water of 7 ml. per pot as shown in the following Table were dropped on the pot. Three weeks after the treatment, the number of the generation of Barnyard grass, number of broad leaf weeds naturally generated and phytotoxicity on paddy rice plant were determined.

| Active ingredient | Dose [2] per 10 ares (g.) | | Number of— | | Phytotoxicity on paddy rice plant |
|---|---|---|---|---|---|
| | | | Barnyard grass | Broad leaf plant | |
| Herbicide of this invention: | | | | | |
| Example 1 | 500 | | 13 | 23 | ± |
| | 250 | | 21 | 34 | — |
| | 100 | | 29 | 33 | — |
| Example 6 | 250 | +500 | 0 | 0 | — |
| | 125 | +250 | 0 | 0 | — |
| | 50 | +100 | 0 | 3 | — |
| | 25 | +50 | 3 | 7 | — |
| Comparative composition (PCP granule) [1]. | 1,000 | | 0 | 0 | + |
| Do | 750 | | 6 | 4 | ± |
| Do | 500 | | 17 | 11 | — |
| Do | 250 | | 27 | 31 | — |
| Nontreated | | | 28 | 36 | — |

[1] Commercially available composition containing PCP sodium salt hydrate.
[2] S-(4-chloro benzyl) N,N-diethylthiocarbamate: sodium salt of PCP.

NOTE.—Phytotoxicity on paddy rice plant: —=No damage; ±=Very slight damage; +=Slight damage.

*Experimental example 5*

Plants to be tested: Wiregrass, Barnyard grass, paddy rice plant (KINMAZE)
  Sizes of pot: Diameter: 15 cm.
  Compositions to be tested:
  (1) Herbicidal composition of the invention (Example 4)
  (2) Herbicidal composition of the invention (Example 5)
  (3) Herbicidal composition of the invention (Example 2)
  (4) Granular composition of 25% sodium salt of PCP (commercially available)

Treatment (1) Soil containing Wiregrass roots was fed in the pot and three groups of young paddy rice plants (one group having two rice plants) were planted in the pot and then 20 Barnyard grass seeds were sowed in the pot and then 24 hours later the pot was treated with the herbicidal compositions (treatment before germination)

(2) Wiregrass was planted in pot, in which soil was filled with water and then the pot was treated with herbicidal compositions (treatment in growing stage).

The determination was made three weeks after the treatment.

*Experimental example 6*

Test place: Paddy field (Alluvial loamy soil)
Test plant: Paddy rice plant (species: NORIN 29)
Plants date: June 18
Test area: 1 zone: 2.5 m.²
Treated date: June 23
Treatment: The composition to be tested was spread uniformly by hand when the paddy field is filled with water in a depth of 3 cm.

Sample (1) The herbicidal composition of the present invention (Example 4)
(2) Ihara PCP granular composition 25 (commercially available, granular composition of 25% PCP)
(3) Kasolon granular composition (commercially available, granular composition of 2.5% DBN)

Determined date: July 14 (weeds within 1 m.²)

| Active ingredient | Dose per 10 ares, kg. | Amount of active ingredients per 10 ares | | Wiregrass treatment before germination | | Wiregrass treatment in the growing stage | | Number of barnyard grass | Phytotoxicity on paddy rice plant |
|---|---|---|---|---|---|---|---|---|---|
| | | Sodium salt of PCP, g. | S-4-chlorobenzyl)-N,N-diethylthiocarbamate, g. | | | | | | |
| Herbicide according to this invention: | | | | | | | | | |
| Example 4 | 1 | 150 | 50 | [1] 1 | [2] 0.7 | [1] 3 | [2] 3.1 | 4 | — |
| | 2 | 300 | 100 | 0 | 0 | 0 | 0 | 0 | — |
| | 3 | 450 | 150 | 0 | 0 | 0 | 0 | 0 | — |
| Example 5 | 1 | 250 | 70 | 0.5 | 0.3 | 2 | 2.8 | 2 | — |
| | 2 | 200 | 140 | 0 | 0 | 1 | 1.7 | 0 | — |
| | 3 | 300 | 210 | 0 | 0 | 0 | 0 | 0 | — |
| Example 2 | 2 | | 100 | 4 | 3.0 | 5 | 5.3 | 17 | — |
| | 5 | | 250 | 1.5 | 1.1 | 3 | 4.0 | 11 | — |
| | 10 | | 500 | 0 | 0 | 0 | 0 | 5 | — |
| Sodium salt of PCP | 1 | 250 | | 5 | 3.5 | 5 | 5.8 | 19 | — |
| Do | 2 | 500 | | 5 | 3.2 | 5 | 5.7 | 7 | — |
| Do | 3 | 750 | | 4.5 | 2.8 | 5 | 5.7 | 1 | + |
| Non-treated | 0 | | | 5 | 3.7 | 5 | 5.6 | 18 | — |

[1] Growth degree of wiregrass.
[2] Weight of living plant of wiregrass (g.).

NOTE.—0=No growth; 5=100% growth.

| Active ingredient, sample | Dose per 10 ares, kg. | Grass weed Number | Grass weed Weight, g. | Broad leaf weed Number | Broad leaf weed Weight, g. | Weight of living plant of Spikerush weight | Phytotoxicity on paddy rice plan |
|---|---|---|---|---|---|---|---|
| (1) Herbicide according to this invention: | | | | | | | |
| (Example 4) | 2 | 14 | 7.0 | 43 | 62 | 0.2 | — |
| Do | 3 | 6 | 3.1 | 4 | 7.3 | 0 | — |
| (2) Ihara PCP granule | 2 | 41 | 98.3 | 107 | 186.0 | 5.4 | — |
| Do | 3 | 7 | 6.2 | 41 | 72.0 | 8.6 | + |
| (3) Kasolon granule | 2 | 63 | 113.0 | 161 | 186.0 | 1.7 | + |
| Do | 3 | 16 | 21.4 | 98 | 81.3 | 0 | ++ |
| (4) Nontreated | 0 | 94 | 216.0 | 208 | 321.0 | 9.7 | — |

NOTE.—Phytotoxicity on rice plant: —=No damage; ±=Very slight damage; +=Slight damage; ++=Moderate damage.

What is claimed is:

1. A herbicidal composition comprising a herbicidally effective amount of a thiocarbamate of the formula:

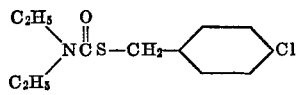

and one or both of an agronomically acceptable carrier and a surfactant.

References Cited

UNITED STATES PATENTS 2,992,091  7/1961  Harman et al. _____ 71—100

FOREIGN PATENTS 272,661  1/1964  Australia _____ 71—100

JAMES O. THOMAS, JR., Primary Examiner.

U.S. Cl. X.R.

71—88, 94

UNITED STATES PATENT OFFICE
CERTIFICATE OF CORRECTION

Patent No. 3,846,115  Dated November 5, 1974

Inventor(s) Konnai et al

It is certified that error appears in the above-identified patent and that said Letters Patent are hereby corrected as shown below:

   should be corrected to

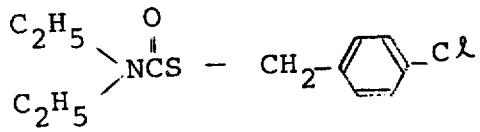

Signed and sealed this 1st day of July 1975.

(SEAL)
Attest:

RUTH C. MASON
Attesting Officer

C. MARSHALL DANN
Commissioner of Patents
and Trademarks